UNITED STATES PATENT OFFICE.

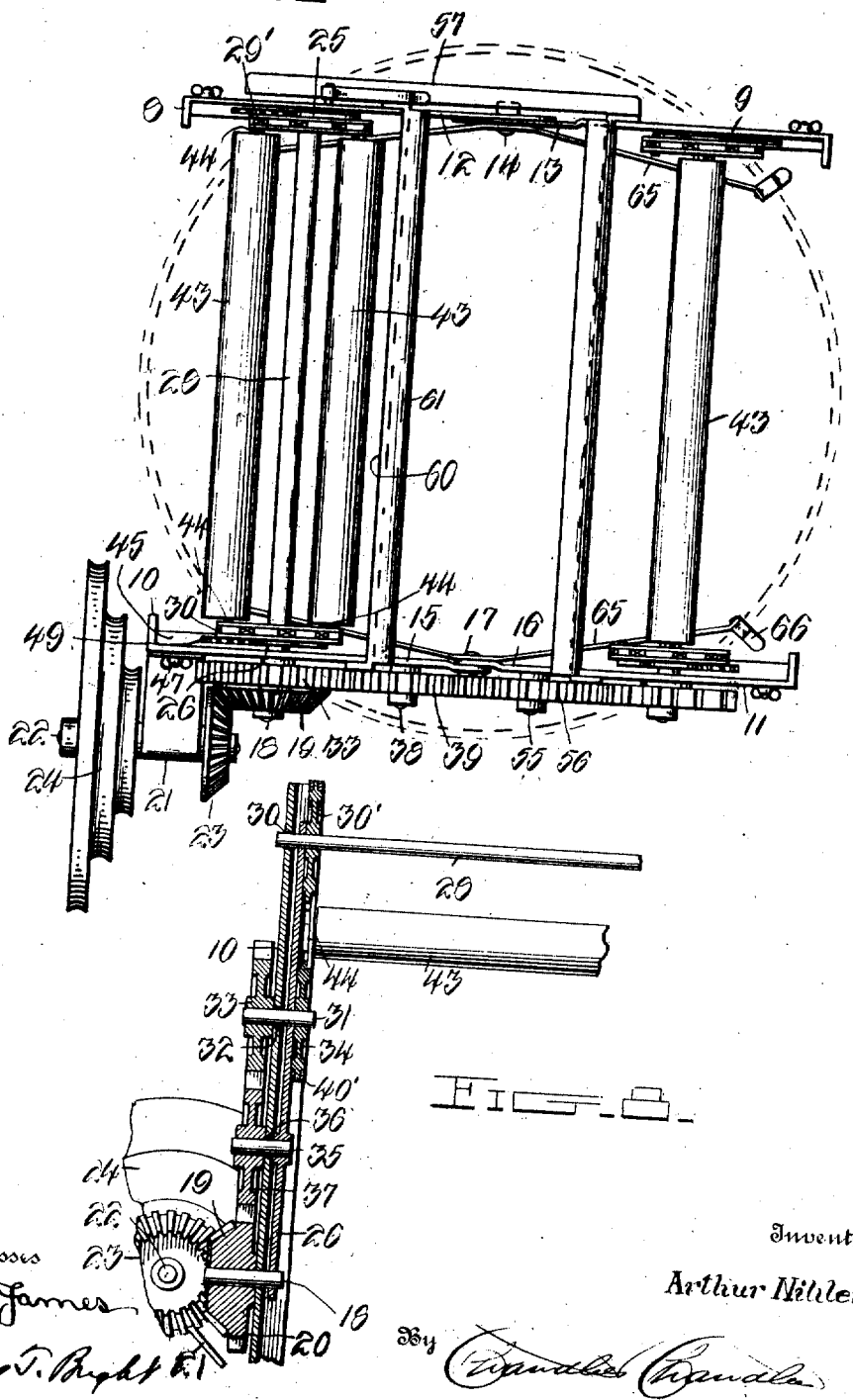

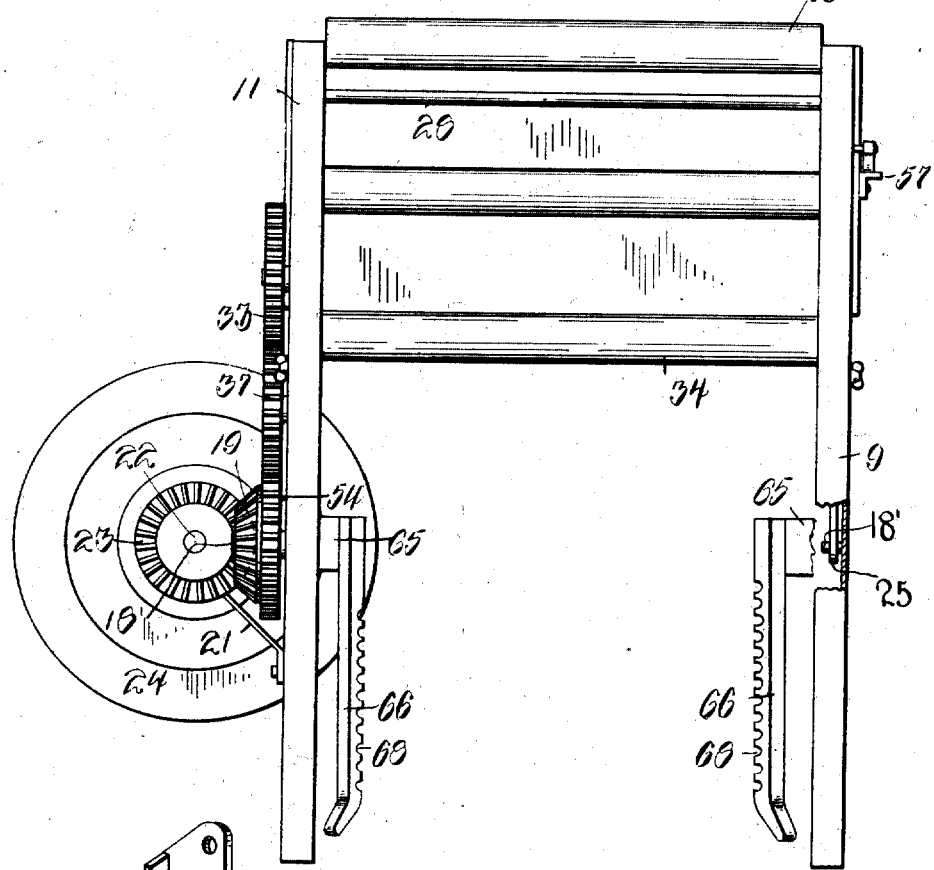

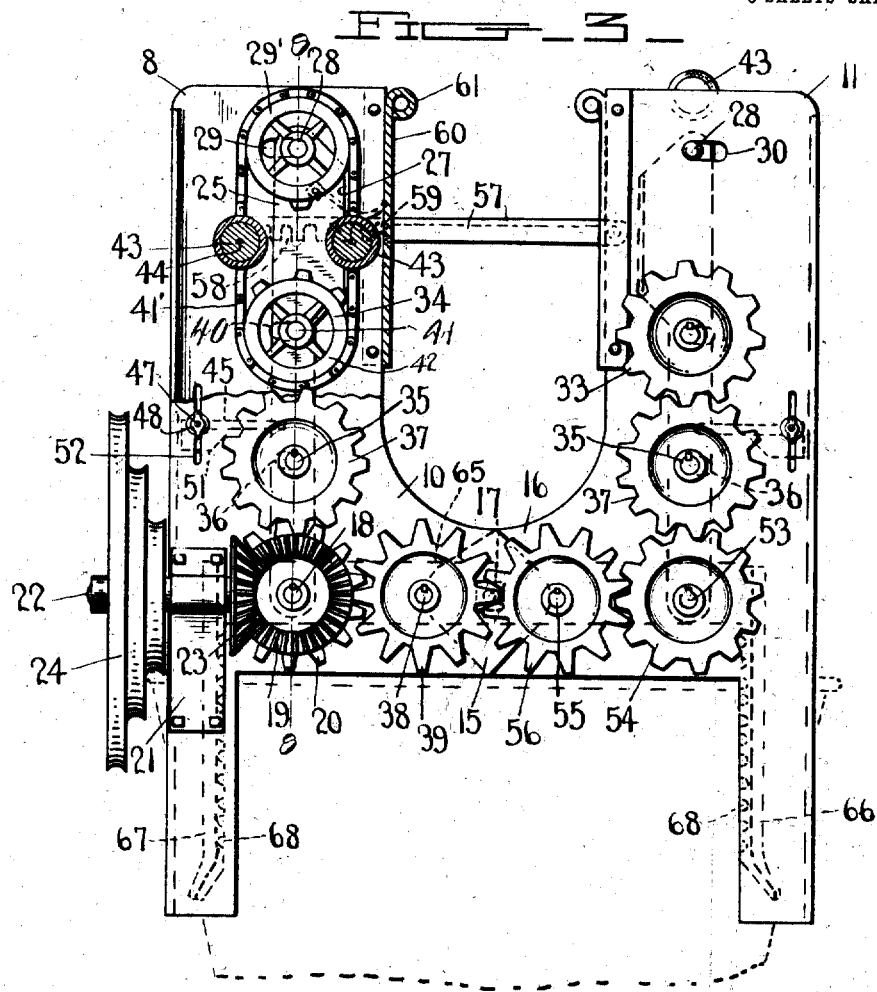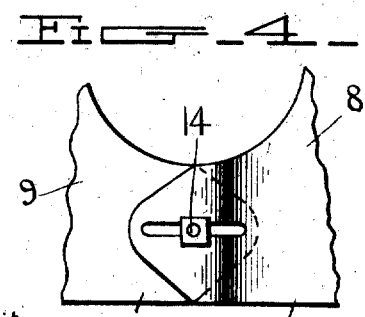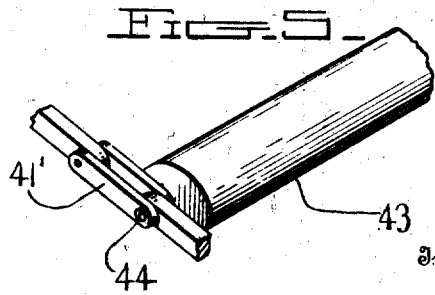

ARTHUR NIHLEN, OF NEW YORK, N. Y.

MILKING-MACHINE.

991,350.
Specification of Letters Patent.
Patented May 2, 1911.

Application filed January 22, 1910. Serial No. 539,446.

*To all whom it may concern:*

Be it known that I, ARTHUR NIHLEN, a citizen of the United States, residing at New York city, in the county of New York, State of New York, have invented certain new and useful Improvements in Milking-Machines; and I do hereby declare the following to be a full, clear, and exact description of the invention, such as will enable others skilled in the art to which it appertains to make and use the same.

This invention relates to milking machines and especially to that class in which the milk is drawn from the udder by an intermittent pressure exerted upon the teats.

The object of the invention is the production of a machine of the type named which will perform a given amount of work in less time than it can be accomplished manually and which will at the same time be natural in its effect and non-injurious to the animal.

A further object of the invention is the construction of a machine of the class indicated which will be exceedingly simple, effective in use and comparatively inexpensive to manufacture, install and maintain.

With the above and other objects in view the invention consists in the details of construction and in the combination and arrangement of parts to be hereinafter more fully set forth and claimed.

In describing the invention in detail reference will be had to the accompanying drawings wherein like characters of reference denote corresponding parts in the several views, and in which, Figure 1 is a plan view of a milking machine constructed in accordance with the invention; Fig. 2, is a side elevation of same; Fig. 3, is a rear elevation partly in section; Fig. 4, is a fragmentary front elevation; Fig. 5, is a detail fragmentary perspective view of one end of a presser roller and the sprocket chain which carries same showing the manner of connecting the roller to the chain; Fig. 6, is a detail view of one of the yielding rails over which the presser rollers and their supporting chains travel; Fig. 7, is a detail view of one of the spring devices which yieldingly support the rails; and, Fig. 8, a partial section on the line 8—8 of Fig. 3.

Referring to the drawings, the machine is shown as formed of two end members, one of which comprises sections 8 and 9 and the other sections 10 and 11. The sections 8 and 9 of one end member are secured to one another in such manner as to be capable of adjustment toward or away from each other and for this purpose the said sections are provided at their adjacent ends with overlapping tongues 12 and 13 respectively; said tongues being offset from the main body portion of said sections so that said main body portions will be positioned in the same vertical plane. The tongues 12 and 13 are each provided with registering slots through which a bolt 14 is inserted; said slots being of sufficient length to permit a limited movement of the sections toward and away from each other and the bolt serving to lock said sections in a desired adjusted relation. Likewise the sections 10 and 11 are provided at their adjacent edges with offset overlapping tongues 15 and 16 respectively, said tongues being provided with registering circular apertures for the reception of a bolt 17, said apertures being substantially the same diameter as bolt 17 whereby the sections 10 and 11 are non-adjustably secured together.

Journaled in the section 10 and projecting externally of said section is a shaft 18 which carries at its outer end a bevel gear 19, while an ordinary gear 20 is mounted on said shaft between the bevel gear 19 and the outer face of the section 10. A corresponding shaft 18′ is journaled in the section 8 for a purpose that will be presently apparent. Secured to the outer face of the section 10 is a bracket 21 which has a shaft 22 journaled therein. Said shaft 22 carries on one end a bevel gear 23 in mesh with the bevel gear 19 and on its other end a plurality of pulleys 24 of varying diameters. A pair of tracks 25 and 26 provided at their upper ends with inwardly extending flanges 27, have their lower ends pivoted respectively to the shafts 18′ and 18 and are disposed adjacent the inner face of the sections 8 and 10 respectively. The upper ends of the tracks 25 and 26 have journaled therein a shaft 28, the terminals of which project through arcuate slots 29 and 30 in the sections 8 and 10 respectively; said slots being the arc of a circle whose center is the longitudinal axis of the shafts 18′ and 18, and whose radius is the distance between shafts 18′ and 18 and shaft 28. Mounted upon the shaft 28 inward of the tracks 25 and 26 respectively are sprocket wheels 29′ and 30′. Passing through the track 26 intermediate its ends and having a journal bearing therein is a short shaft 31 which projects at one end through an arcuate slot 32 in the section 10; said slot being concentric with the arcuate slot 30. Mounted on the outer end of this short shaft 31 is a gear wheel 33 while the inner end of said shaft carries a sprocket wheel 34 disposed in vertical alinement with the sprocket wheel 30'. Passing through the track 26 between shafts 31 and 18 and having a journal bearing in said track is another short shaft 35 which projects through an arcuate slot 36 in the section 10, said slot being also concentric with the arcuate slot 30. Mounted on the outer end of this short shaft 35 is a gear 37 which meshes with both gears 33 and 20. Disposed in horizontal alinement with respect to shaft 18 and journaled in section 10 is a shaft 38 which has mounted thereon a gear 39 in mesh with gear 20.

Journaled in the track 25 and having its outer end projecting into an arcuate slot 40, concentric with the slot 29 is a short shaft 41 the inner end of which has mounted thereon a sprocket wheel 42 in vertical alinement with the sprocket wheel 29'.

Traveling upon the sprocket wheels 30' and 34 is a sprocket chain 40' and a similar chain 41' is mounted for travel upon sprocket wheels 29' and 42. Connecting the chains 40' and 41' at suitable intervals are the presser rollers 43 which are constructed preferably of rubber so as to yield gently under pressure. The rollers 43, as is usual have their cores formed of a non-resilient material which in this instance are extended at each end as at 44 and serve the double function of securing the rollers to the sprocket chains and of constituting a pivot pin for connecting certain adjacent links of the sprocket chains together. During the travel of the chains 40' and 41' they pass over the inwardly extending flanges 27 of the tracks 25 and 26.

In order to constantly tend to hold the tracks 25 and 26 and the shaft 28 at the forward end of the slots 29 and 30 there is mounted on each of the sections 8 and 10 corresponding spring actuated devices exerting a force on the terminals of said shaft 28 to move same toward the inner end of said slots 29 and 30. As each of these devices are identical in every respect only that which is mounted on the section 10 will be referred to in detail. Said device comprises a tubular member 45 which has one end thereof closed by a filling of lead 46 and projecting through the wall of said tubular member and having one end thereof embedded in the filling 46 is a set screw 47. The outer end of said set screw is threaded and provided with a thumb nut 48. The tube 45 is slotted longitudinally as at 49 to receive the track 25 and a spring 50 is mounted in said tube and has one end bearing against the track 26 and the other end bearing against the filling 46. The tube 45 has secured to and depending therefrom a metal plate 51 adapted to bear against the outer face of the section 10 when the device is mounted thereon. Said device is adjustably secured to the section 10 by slotting said section vertically as at 52 and projecting the set screw 47 through said slot so that the threaded end thereof will be disposed beyond the outer face of said section. The nut 48 is then mounted on the screw 47 and it will be readily seen that the device just described can be adjusted within the limits of the slot 52 and thus moved away from and toward the pivot point of the track 26 and secured in any desired position. It will thus be apparent that when the track 26 is inserted in the slot 49 the spring 50 will constantly tend to force said track and shaft 28 toward the inner end of the slot 29 but will permit said track and shaft to be moved toward the outer end of said slot when a pressure greater than the spring 50 is exerted on the rollers 43. The force exerted by the spring 45 can be increased by adjusting the device away from the pivot of the track 26 and decreased by an adjustment of the device in the opposite direction.

Connecting the inner edges of the sections 8 and 10 is a vertically disposed presser plate 60 which has its upper end curved toward the center of the machine in the form of a circle as at 61.

Journaled in the sections 9 and 11 and disposed therebetween is a shaft 53 which has mounted thereon externally of the section 11 a gear wheel 54, said shaft 53 being disposed in horizontal alinement with the shafts 18 and 38 journaled in the section 10. Another short shaft 55 is journaled in the section 11 and disposed between the shafts 38 and 53 in horizontal alinement therewith and has mounted thereon externally of the section 11 a gear wheel 56 which meshes with the gear 39 and the gear wheel 54.

It will be understood that the shaft 53 and the gear wheel 54 correspond with the shaft 18 and the gear wheel 20 mounted between the sections 8 and 10 and as the parts of the machine which are disposed above the shaft 53 and gear wheel 54 between the sections 9 and 11 are identical with those disposed above the shaft 18 and gear wheel 20 between the sections 8 and 10 a detail description thereof will be omitted.

As has been previously mentioned the sections 8 and 9 are adapted to be adjusted toward and away from each other and in order to secure said sections in a desired adjusted position a latch 57 is pivoted to the section 9 and has provided on its lower edge a series of teeth 58 which are adapted to interlock with a pin 59 secured to the section 8.

In operation, a pair of teats are placed between each set of rollers 43 and their accompanying plates 60. The shaft 22 is then rotated by a belt connection between pulleys 24 and a suitable power shaft. This rotation of the shaft 22 will in turn rotate shaft 18 through the engagement between bevel gears 23 and 19. As gear 20 is fixed to shaft 18 same will be rotated in unison with said shaft and thus effect a rotation of gears 39, 56, 54, 37, 33 and operate the machine as an entirety. During the travel of sprocket chains 39 and 40 the several rollers 43 will be brought successively into contact with the teats and will move downward thereon with sufficient elastic pressure exerted by spring 50 to force the teats against the plate 60 and draw the milk without injury or discomfort to the animal. It will be observed that by curving the upper ends of plate 60 inwardly of the machine the possibility of sharp surfaces contacting with the udder is obviated.

The machine is supported upon milking pails by any suitable means, the particular supporting means illustrated comprising corresponding spring steel plates 65 which are mounted at opposite ends of the machine through the instrumentality of the bolts 14 and 17 respectively. Secured at the ends of each of these plates and depending therefrom are latches 66 which have their inner faces provided with a series of teeth 68 adapted to receive the enlarged rim at the top of the pail. The distance between the latches 66 and 67 is such that in order to insert the top of the pail therebetween it will be necessary to expand same a little. When the top of the pail is moved toward said latches they are released and spring back upon the rim at the top of the pail and grip same, thereby supporting the machine in an efficient manner. The engagement of the latches 66 and 67 can be as readily released by again extending said latches so as to permit the withdrawal of the pail from therebetween.

Instead of utilizing a plurality of cog wheels for transmitting motion to the various parts of the machine, said cog wheels may be greatly reduced in number and sprocket chains utilized with equal efficiency for effecting the operation of the device.

What is claimed is:—

1. A milking machine comprising end members, each formed of a pair of sections, means for independently adjusting the sections of one end member toward and away from each other at their upper and lower ends, intermittent pressure mechanisms mounted between corresponding sections of said end members, and means for actuating said intermittent pressure mechanisms.

2. A milking machine comprising end members and opposed heads mounted between said end members, each of said heads comprising a pressure plate, a pivoted pressure mechanism mounted for movement toward and away from said pressure plate, spring actuated means engaging said mechanism and constantly tending to move same toward said plate, means for adjusting said spring actuated means, whereby the latter will engage said mechanism at different distances from its pivot, and means for actuating said mechanism.

3. A milking machine comprising end members and opposed heads mounted between said end members, each of said heads comprising a pressure plate, a pair of pivoted spaced arms supported by said end members, a pressure mechanism mounted between said arms for movement toward and away from the pressure plate, a tube mounted on each member for adjustment vertically thereof and having diametrically opposed slots opening through one end in which said pivoted arms are disposed respectively, a spring in each of said tubes engaging said arms respectively, and means for actuating said pressure mechanism.

In testimony whereof, I affix my signature, in presence of two witnesses.

ARTHUR NIHLEN.

Witnesses:
MAMIE A. KLENK,
SARAH F. PORTER.